(12) United States Patent
Hyoi

(10) Patent No.: US 6,315,407 B2
(45) Date of Patent: Nov. 13, 2001

(54) HIGH-TENSION THREAD FASTENING STRUCTURE FOR EYEGLASSES FRAME

(76) Inventor: Isao Hyoi, 10-104, Ipponden-Fukusho, Maruoka-cho, Sakai-gun, Fukui (JP), 910-0254

( * ) Notice: Subject to any disclaimer, the term of this patent is extended or adjusted under 35 U.S.C. 154(b) by 0 days.

(21) Appl. No.: 09/793,649

(22) Filed: Feb. 27, 2001

(30) Foreign Application Priority Data

Feb. 28, 2000 (JP) .................................................. 12-050963

(51) Int. Cl.[7] ..................................................... G02C 1/08
(52) U.S. Cl. ............................. 351/92; 351/90; 351/103; 351/106
(58) Field of Search ................................... 359/90, 92, 91, 359/103, 104, 105, 106, 108, 109, 107

(56) References Cited

U.S. PATENT DOCUMENTS 5,914,768 * 6/1999 Hyoi ...................................... 351/103
5,992,995 * 11/1999 Perie ....................................... 351/92

* cited by examiner

Primary Examiner—Hong Xuan Dang
(74) Attorney, Agent, or Firm—Wenderoth, Lind & Ponack L.L.P.

(57) ABSTRACT

Disclosed is a high-tension thread fastening structure for an eyeglasses frame having a lens held by stretching a length of high-tension thread around the lower sector of the lens to push the lens against the upper sector of rim. The length of high-tension thread has a single knot formed at each end, each knot being caught by each end of the upper sector of rim, and being terminated with a spherical end, thereby preventing the loosening or unbinding of the fastening. Alternatively the length of high-tension thread has first and second knots formed at each end, the first knot being caught by each end of the upper sector of rim, thereby preventing the loosening or unbinding of the fastening by using the second knot as a backup for the first knot.

2 Claims, 10 Drawing Sheets

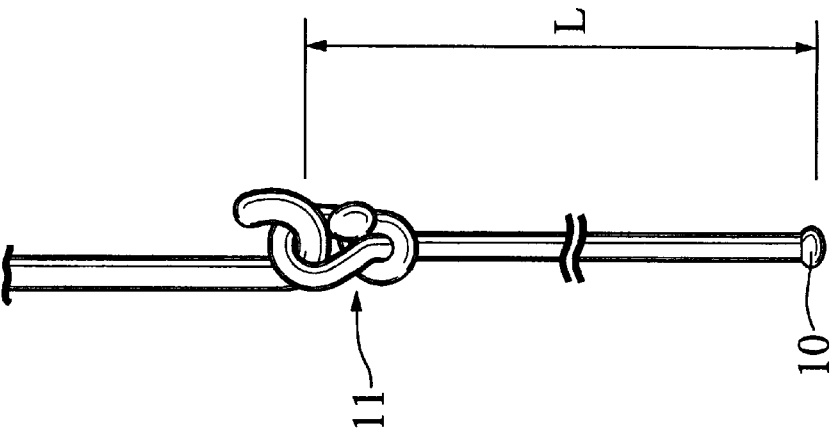
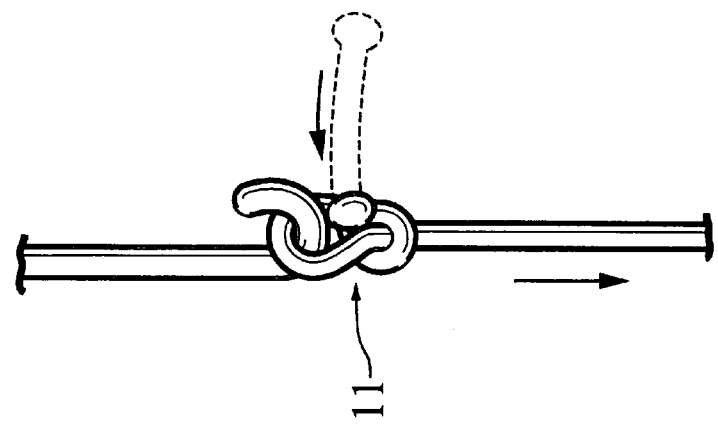
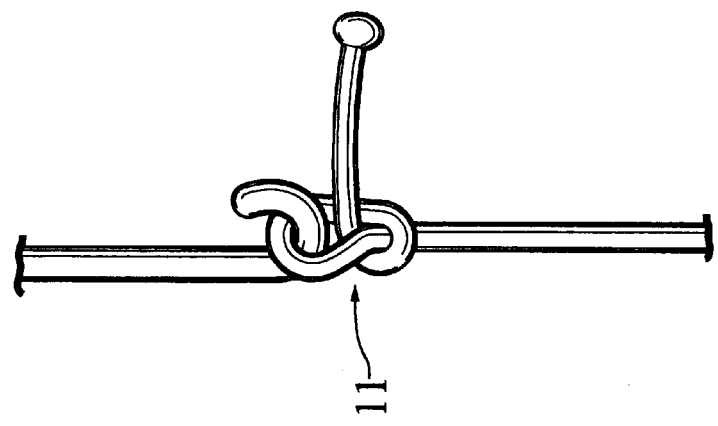
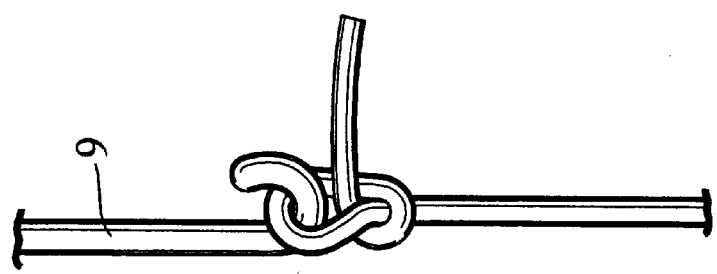

FIG.4
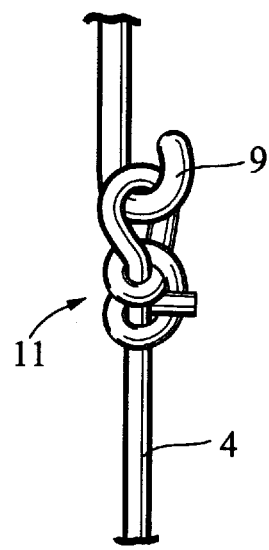
FIG.5a
FIG.5b
FIG.5c
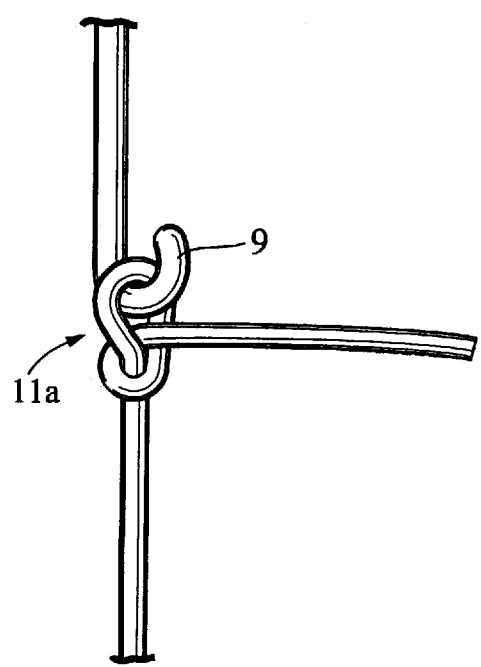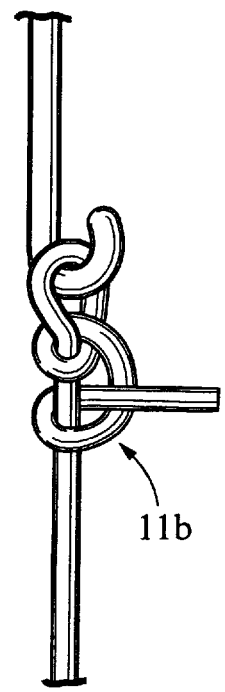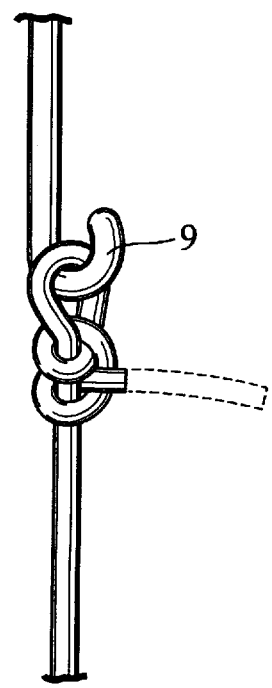

//h1 HIGH-TENSION THREAD FASTENING STRUCTURE FOR EYEGLASSES FRAME

BACKGROUND OF THE INVENTION

1. Field of the Invention

The present invention relates to a frame using a length of high-tension thread for fastening a lens in each half-rim, and more particularly to the fastening structure, of the high-tension thread to each end of the half-rim.

2. Related Arts

An eyeglasses frame of the type to which the present invention can be applied has a pair of parts each comprising a half-rim and a length of thread stretched between the opposite ends of the half-rim, holding a lens between the stretched thread and the half-rim. Such half-rimmed glasses are light, significantly widening the field of sight. As seen from FIG. 9, a most popular frame of such type comprises two circular-arc rims "a" connected by an intervening bridge "d", a length of thread "b" stretched between the opposite ends of each circular-arc "a" to hold the lens "c" between the circular-arc rim "a" and the stretched thread "b". Each circular-arc rim "a" has a rectangular shape in cross-section. The half-rim has a joint piece "e" integrally connected to its outer edge, and a temple is hinged to the joint piece "e", thereby permitting the temple to be folded on the front.

FIG. 10 shows an enlarged cross section taken along the line 10—10 in FIG. 9. As seen from the drawing, the half-rim "a" has a groove made on its inner side whereas the lens "c" has a groove made on its outer circumference. The lens "c" is fixed to the half-rim "a" by inserting a flexible cocoon-shaped piece "f" into the confronting grooves of the lens and the half-rim "a".

FIG. 11 shows how the length of thread "b" is fixed to each end of the half-rim "a". The half-rim "a" has two holes made in each end. Each hole is 0.7 millimeters in diameter, and the two holes are separated 1.5 millimeters apart from each other. Each end of the thread is inserted into these holes as shown in FIG. 11(a). The lens is fitted in the space defined by the half-rim and the thread "b", to which the stretch of 1 to 3 kilograms is applied. The thread "b" is apt to invaginate in the groove "g" of the half-rim "a", so that the thread "b" is caught by the groove "g" as shown in FIG. 11(b). Although the thread "b" cannot be slipped off from the holes, the thread "b" can be often cut and broken by the sharp edge "h" of the circumference of the hole.

FIG. 12(a) shows another form of wire half-rim. FIG. 12(b) is a perspective view of the end of the half-rim. The half-rim is called "T-type rim", which requires no joint such as the flexible cocoon-shaped piece "f". It has projection "i" extended along the inner circumference of the rim and the projection "i" is fitted in the circumferential groove of the lens. The end of the half-rim has two holes "j" made therein. Each end of the thread is inserted in these holes "j". The thread, therefore, is apt to be cut and broken there when it is stretched, as is the case with the half-rim described above with reference to FIG. 11.

FIG. 13 shows a wire half-rim to be fitted in the circumferential groove of the lens. FIG. 13(a) is a cross-section of the lens, showing how the wire half-rim is fitted in the circumferential groove of the lens. FIG. 13(b) is a perspective view of the end of the half-rim. The half-rim fitted in the circumferential groove of the lens is invisible, giving a slim shape to the eyeglasses. As seen from FIG. 13(b), the half-rim has a joint piece "k" soldered to its end, and the joint piece "k" has two holes "j" made therein. Each end of the thread is inserted in these holes "j". The thread, therefore, is apt to be cut and broken there when it is stretched, as is the case with the half-rim described above.

The thread to be used in such a frame is 0.52 millimeters thick, and it has a stretch strength of approximately 10 kilograms. The conventional thread-fastening structures allow the thread to be broken when being subjected to the stretch of approximately 3.6 kilograms, much smaller than the inherent stretch strength of the thread.

FIG. 14 shows still another example of fastening structure (see Japanese Patent Application No. H-9-250091). As shown in the drawing, the thread "b" has a loop "l" formed on each end whereas the half-rim has a hook "m" formed on each end. Each loop "l" of the thread "b" is caught by the associated hook "m" of the half-rim. As seen from the enlarged view of FIG. 14(b), the thread "b" has its folded end crimped by an associated sleeve "n", which has its inner surface knurled. With this arrangement the thread can be resistive to the stretch of approximately 8.4 kilograms. As seen from FIG. 15, the thread has two loop ends at its opposite ends, leaving a predetermined length therebetween. This configuration, however, prevents the adjusting of the loop-to-loop length to tightly encircle a selected lens.

After grinding and reshaping lenses in the eyeglasses shop the so reshaped lenses are fitted in the half-rimmed frame by making the loops of such predetermined length of threads to be caught by the hooks of the half-rims of the front. If the predetermined length of thread is too long, the lens is apt to slip off from the front. Conversely, if the predetermined length of thread is too short, the lens cannot be held in the front. If the thread is stretched around the lens by force to be caught by the hooks of the half-rim, the lens and/or the thread is subjected to a destructive force, thus breaking the lens or thread.

SUMMARY OF THE INVENTION

One object of the present invention is to provide a high-tension thread fastening structure for an eyeglasses frame which is free from such disadvantages as described above, permitting the adjusting of the thread length to meet each occasional demand for tightly encircling each lens, still making the full use of the stretch strength of the high-tension thread used.

To attain this object a high-tension thread fastening structure for an eyeglasses frame having a lens held by stretching a length of high-tension thread around the lower or upper half-circumference of the lens to push the lens against the upper or lower sector of one or the other part of the front of the frame, is improved according to the present invention in that the length of high-tension thread has a knot formed at each end, each knot being caught by each end of one or the other part of the front, and each knot being terminated with a spherical end, which can be formed by heating the terminal end of the knot and by allowing the heated end to change into the spherical shape, thereby preventing the loosening or unbinding of the fastening.

Also, a high-tension thread fastening structure for an eyeglasses frame having a lens held by stretching a length of high-tension thread around the lower or upper half-circumference of the lens to push the lens against the upper or lower sector of one or the other part of the front of the frame, is improved according to the present invention in that the length of high-tension thread has first and second knots formed at each end, the first knot being caught by each end of one or the other part of the front, thereby preventing the loosening or unbinding of the fastening by using the second knot as a backup for the first knot.

Other objects and advantages of the present invention will be understood from the frames according to preferred embodiments of the present invention, which are shown in accompanying drawings.

BRIEF DESCRIPTION OF THE DRAWING

FIGS. 3a–3d illustrates how the high-tension fastening structure according to the first embodiment is formed;

FIG. 4 illustrates a high-tension fastening structure using a double knot according to a second embodiment;

FIGS. 5a–5c illustrates how the high-tension fastening structure according to the second embodiment is formed;

DETAILED DESCRIPTION OF PREFERRED EMBODIMENT

Figure 1:
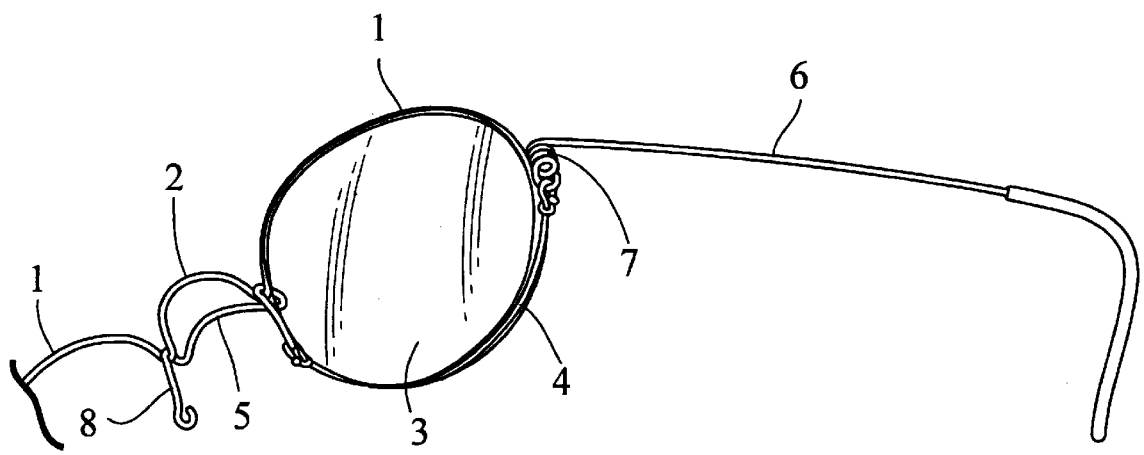
FIG. 1 is a perspective view of a frame having a high-tension fastening structure formed at each end of one or the other part of the front of the frame according to a first embodiment of the present invention.

Referring to FIG. 1, a length of thin metal in the form of thread is formed into the front of the eyeglasses frame, which front is composed of a pair of half-rims 1 and 1 integrally connected via an intervening bridge 2. A length of high-tension thread 4 such as nylon thread is stretched around the lens 3 to push it against the half-rim 1. An auxiliary arch-like bridge piece 5 is caught by the opposite bridge-to-rim transient recesses, each being formed between the bridge 2 and the adjoining half-rim 1. Each temple 6 has a coiled spring 7 formed at its end. The length of thread 4 is bound and fastened by its opposite ends both to a selected leg 8 of the auxiliary bridge 5 and to the coiled spring 7 of the temple 6, thereby holding the lens 3 along with the half-rim 1.

The auxiliary bridge 5 has the effect of increasing the strength of the bridge 2, which is a part of a single thread-like metal formed into the front of the frame. The temple 6 is foldably connected to the outer edge of the half-rim 1 by inserting its upright pivot pin into the coiled spring 7 of the temple 6. The temple 6 can be expanded outward more or less beyond the upright position while allowing the coiled spring 7 to be twisted accordingly.

Figure 2:
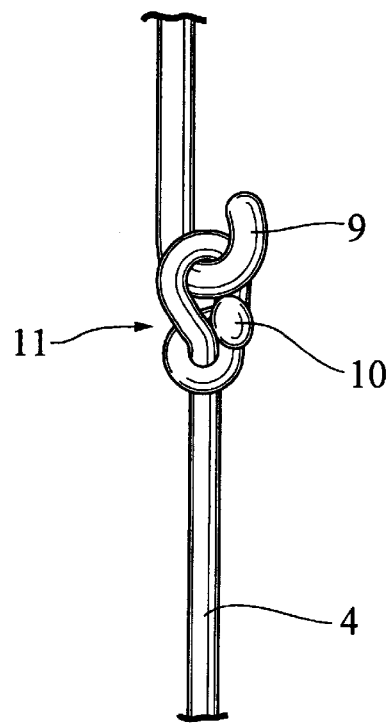
FIG. 2 illustrates a high-tension fastening structure using a single knot terminating with a spherical end according to the first embodiment.

Referring to FIG. 2, the end of the thread 4 is fastened to the hook end 9 of the coiled spring 7 by binding. To prevent the thread end from being unbound the terminal end of the thread is changed into a spherical shape 10 by heating it into a liquid-like form and by allowing the liquid-like form to change into a round shape under the influence of surface tension. Thus, the knot 11 cannot be loosened or unbound even if the thread 4 is exposed to an increased stretch.

Figure 11A:
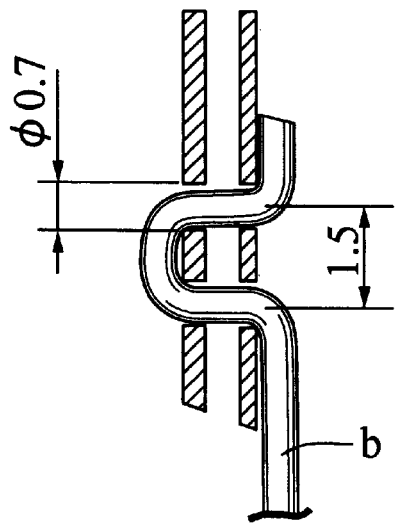
FIGS. 11a–11b illustrates how the conventional high-tension fastening structure behaves.
Figure 11B:
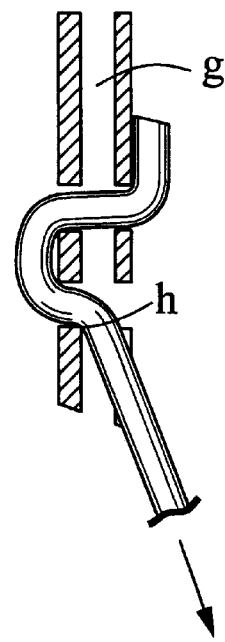
Figure 12A:
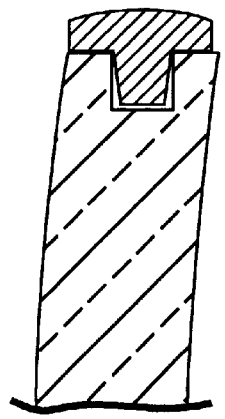
FIG. 12(a) is a cross-section of a half-rim and an associated lens.
Figure 12B:
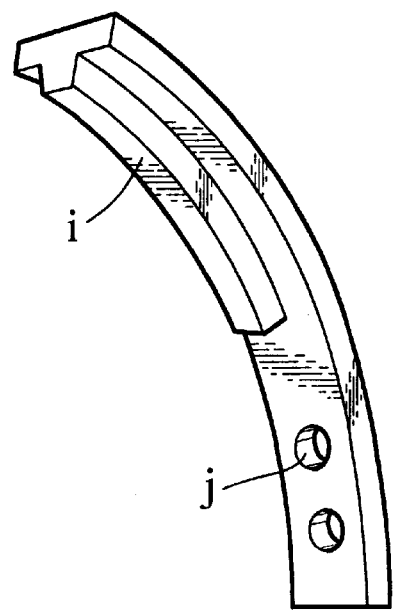
FIG. 12(b) is a perspective view of the end of the half-rim.
Figure 13A:
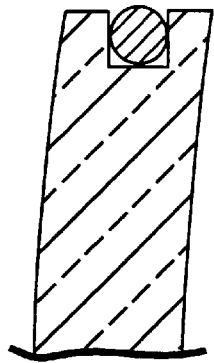
FIG. 13(a) is a cross-section of another half-rim and an associated lens.
Figure 13B:
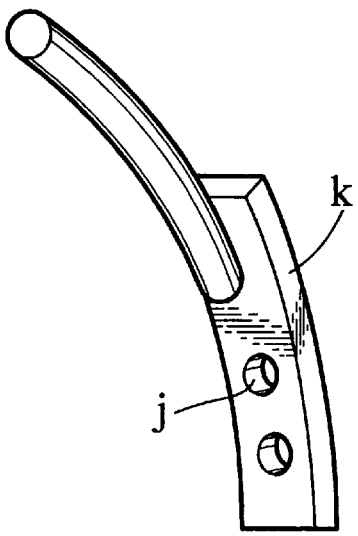
FIG. 13(b) is a perspective view of the end of the half-rim.
Figure 14A:
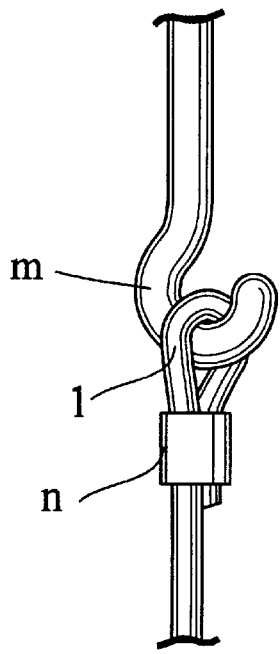
FIGS. 14a–14b illustrates a length of thread having a loop formed and crimped at its end.
Figure 14B:
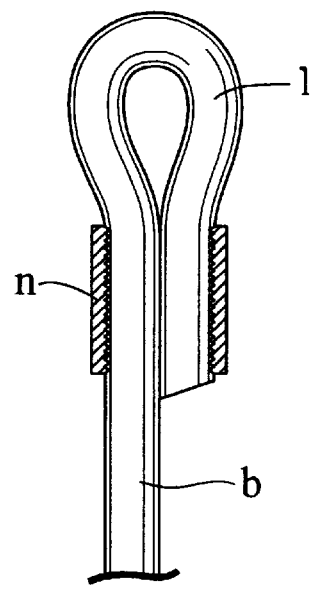
Figure 15:
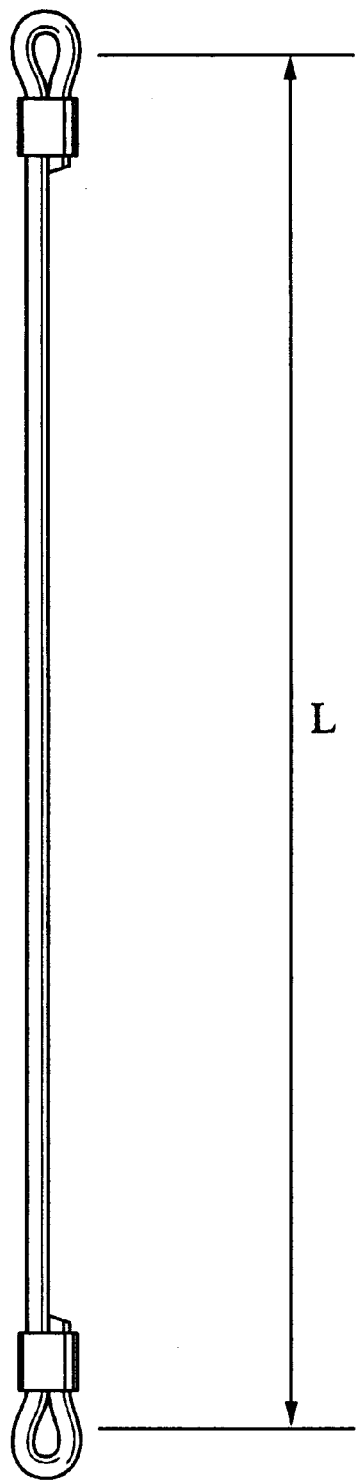
FIG. 15 illustrates a length of thread having a loop formed and crimped at each end.

The stretch strength or stretch-resistant force is approximately 7 kilograms high, twice as large as the fastening structure of FIG. 11. The length of thread can be easily adjusted simply by displacing the knot 11 in position. Referring to FIGS. 3(a) to 3(d), the manner in which the terminal length of the thread 4 is bound and caught by the hook end 9 of the coiled spring 9. The terminal length of the thread 4 is bound to the hook end 9 of the coiled spring 9, and the remaining terminal length is cut, leaving a short length ahead of the knot 11 (see FIG. 3(a)). The end of the short length of thread is heated by using a lighter, thus changing the thread end into round (see FIG. 3(b)). The thread 4 is pulled until the round end is caught by the knot 11 (see FIG. 3(d)). The thread 4 is cut to be in conformity with the lens size, changing its free end to round 10 in a similar way, and then, the free end of the thread is bound to the other hook end of the half-rim as described above.

Referring to FIG. 4, another fastening of the thread to the hook end 9 of the coiled spring 7 is described below. The fastening is effected in the form of double binding, thereby preventing the loosening or unbinding, which might be caused if the knot 11 were in the single form. The stretch-resistant strength of the double binding is approximately 10.8 kilograms, and is as large as the stretch-resistant strength of the thread.

FIG. 5 shows the manner in which such a double binding is formed. At first, the terminal length of the thread is bound around the hook end 9 to form the first knot 11a, as seen from FIG. 5(a). Another knot 11b is formed adjacent to the first knot 11a, as seen from FIG. 5(b). The first knot 11a is formed at such a selected position that the remaining length of thread may be long enough to go around the lower circumference of the lens 3, and the second knot 11b is formed to prevent the first knot 11a from being unbound. The terminal length extending from the second knot 11b is cut and removed, as seen from FIG. 5(c).

FIG. 6 shows still another fastening structures of high-tension thread. Referring to FIG. 6(a), the end of the coiled spring 7 is formed into a "U"-shaped hook 13a, and the terminal length of the thread is put in the "U"-shaped hook 13a. Then, the length of thread ahead of the hook is formed in a knot 12, which is large enough to be caught by the hook 13a. Referring to FIG. 6(b), the terminal length of the coiled spring 7 is formed into a closed loop 13b, and the terminal length of the thread is inserted in the closed loop 13b. Then, the length of thread ahead of the loop 13b is formed into a knot 12, which is large enough to be caught by the loop 13b. In either case the end of the thread is formed into a spherical shape 14, thereby preventing the knot 12 from being unbound.

Fastening structures according to the present invention can be applied equally to eyeglasses frames of FIG. 7.

Figure 7A:
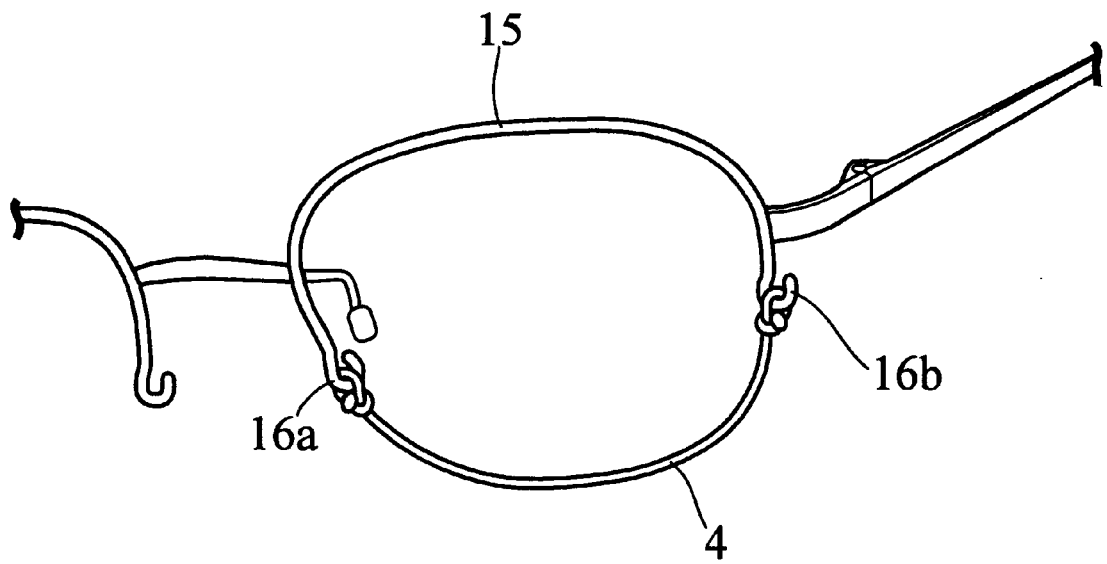
FIGS. 7a–7b illustrates another frames each having a different catch shape formed at each end of the upper sector of one or the other part of the frame.
Figure 7B:
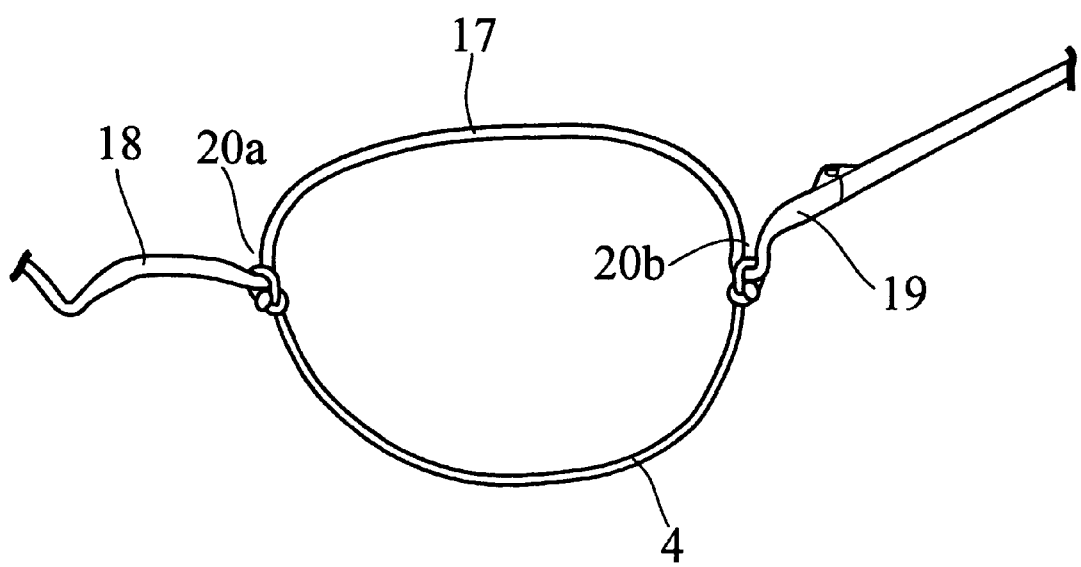
Figure 8A:
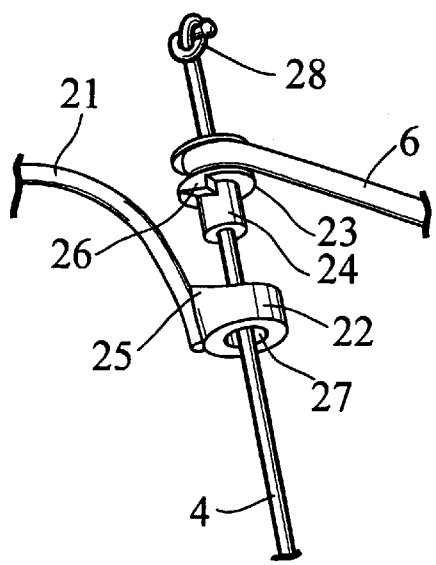
FIGS. 8a–8d illustrates a high-tension fastening structure according to a third embodiment.
Figure 8B:
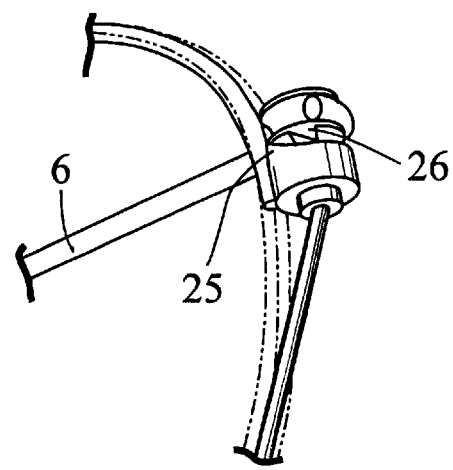
Figure 8C:
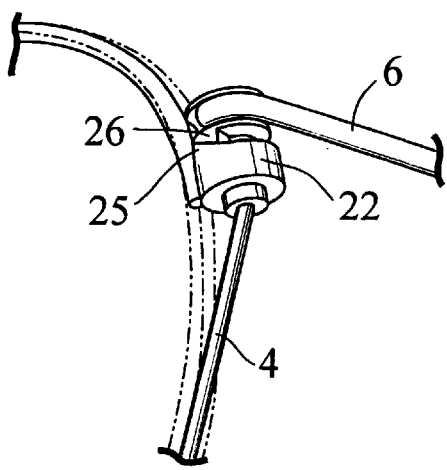
Figure 8D:
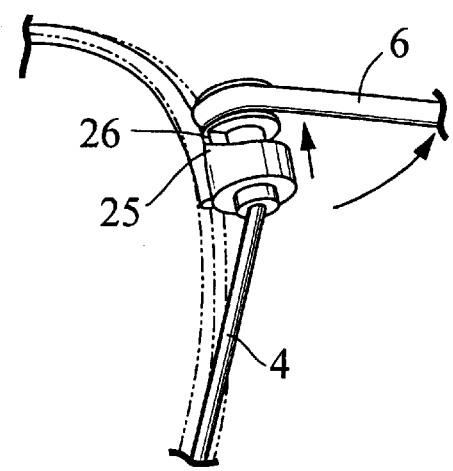
Figure 9:
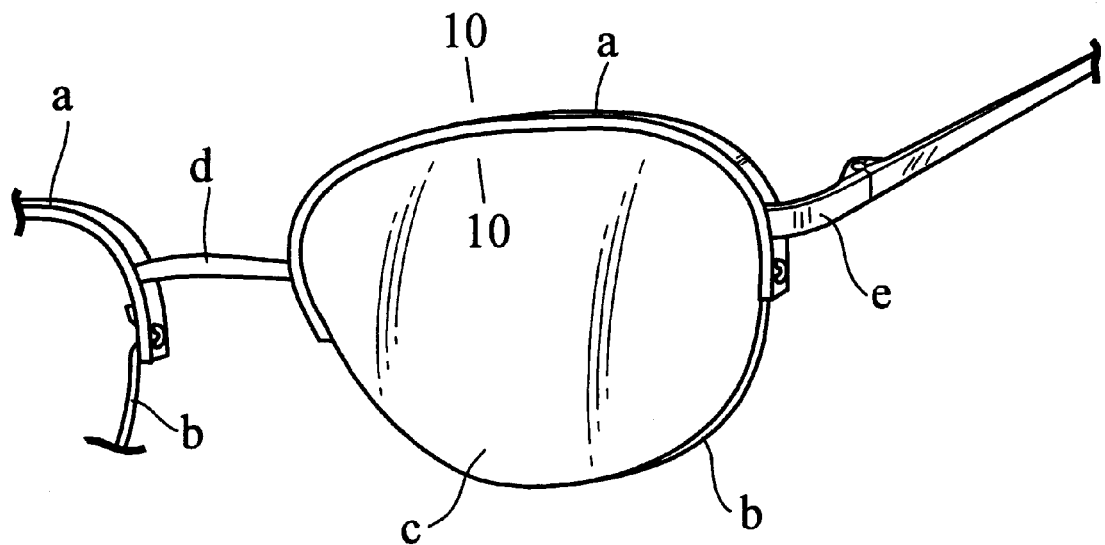
FIG. 9 is a perspective view of a frame having a conventional high-tension fastening structure formed at each end of one or the other part of the front of the frame.
Figure 10:
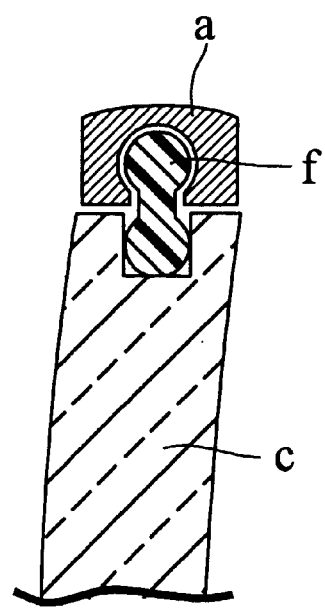
FIG. 10 is a cross-section of the front taken along the line 10—10 in FIG. 9.

Specifically the half-rim 15 of FIG. 7(a) has hooks 16a and 16b formed at its opposite ends, and a length of thread 4 is bound by its opposite ends to the hooks 16a and 16b. As for an eyeglasses frame of FIG. 7(b) a length of thread-like metal is formed into a pair of half-rims 17 integrally connected via an intervening bridge 18, each half-rim 17 having a temple joint 19 formed at its outer end. As seen from the drawing, the rim-to-joint transient part is formed into a recess 20b whereas the bridge-to-rim transient part is formed into another recess 20a. A length of thread 4 is bound by its opposite ends to these recesses 20a and 20b, tightly encircling the lower circumference of the lens.

Referring to FIG. 8, the half-rim 21 has a pivot-bearing cylinder 22 soldered to its end, and the temple 6 has a collared pivot 24 soldered to its end. As seen from the drawing, the pivot bearing cylinder 22 has a cam configuration 25 formed on its upper surface whereas the collared pivot 24 has a counter cam configuration 26 formed on its collar 23. A length of thread 4 is inserted in the hole 27 of the pivot bearing cylinder 22, ending with a knot 28, which is large enough to be caught by the hole of the pivot assembly, thereby preventing the thread 4 from passing through the pivot assembly. It should be noted that the knot 28 is guaranteed to be free of unbinding or loosing by forming a spherical shape 14 as in FIG. 6(d) or by forming a double knot as in FIG. 5. The pivot 24 is fitted rotatably in the pivot bearing cylinder 22, thus permitting the temple 6 to be folded on the front (see FIG. 8(b)) or raised upright on the front (see FIG. 8(c)). The temple 6 can be expanded more or less beyond the upright position as shown in FIG. 8d. Then, the thread 4 is stretched to pull the pivot 24 in the pivot bearing cylinder 22, allowing the cam configuration 25 to abut on the lower surface of the collar 23, and the cam configuration 26 to abut on the upper surface of the bearing cylinder 22, thus letting these cams slide on each other while the temple 6 is being folded on and unfolded apart from the front of the eyeglasses frame.

Figure 6A:
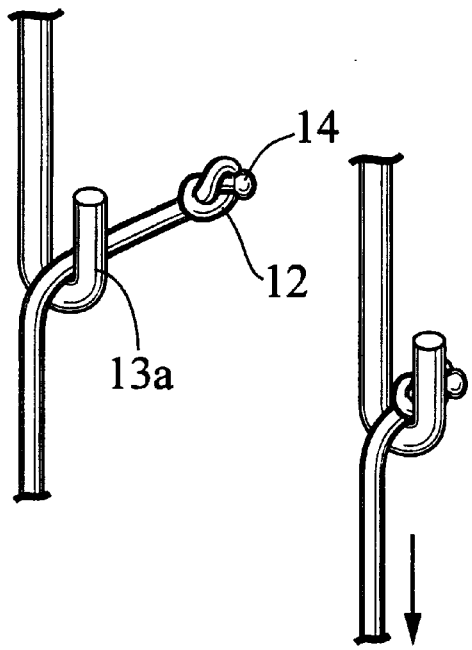
FIGS. 6a–6d illustrates how a high-tension fastening structure according to the first embodiment is caught by a hook or loop end, which is formed at each end of the half-rim.
Figure 6B:
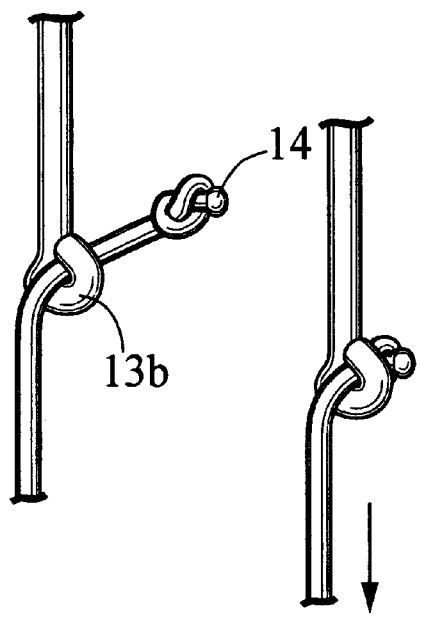
Figure 6C:
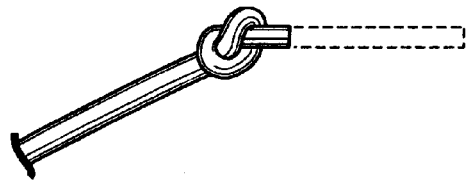
Figure 6D:
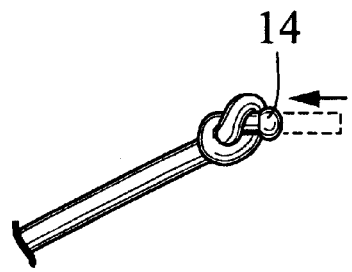

As seen from FIG. 6(d), the further expansion of each temple beyond its upright position will allow the rotatable cam 26 to climb the stationary cam 25, thereby raising the pivot 24 upward. Accordingly the thread 4 is stretched still more to pull down the rising pivot 24 with the result that the temple 6 is driven toward the closing position. Thus, the same function as the conventional hinge structure can be attained. Different from the high-tension thread fastening structures fixed to the opposite ends of each half-rim as described above, the thread fastening structure according to this particular embodiment may be fixed to the end of each temple.

As may be understood the above, a high-tension thread fastening structure according to the present invention can hold the lens by forming a knot at each end of the length of thread, thus eliminating the possibility of being cut and broken which would be caused by allowing the sharp circumferential edge of the hole to invade the thread thickness as in the conventional fastening structure. The stretch-resistant force of the thread having a spherical shape formed at its end is approximately 7 kilograms whereas the stretch-resistant force of the thread having a double knot formed at its end is approximately 10.8 kilograms. The knotting-and-fastening of the thread permits easy adjustment of the length of the thread to encircle and hold the lens with good grip.

What is claimed is:

1. A high-tension thread fastening structure for an eyeglasses frame having a lens held by stretching a length of high-tension thread around the lower or upper half-circumference of the lens to push the lens against the upper or lower sector of one or the other part of the front of the frame, characterized in that the length of high-tension thread has a knot formed at each end, each knot being caught by each end of one or the other part of the front, and each knot being terminated with a spherical end, which can be formed by heating the terminal end of the knot and by allowing the heated end to change into the spherical shape, thereby preventing the loosening or unbinding of the fastening.

2. A high-tension thread fastening structure for an eyeglasses frame having a lens held by stretching a length of high-tension thread around the lower or upper half-circumference of the lens to push the lens against the upper or lower sector of one or the other part of the front of the frame, characterized in that the length of high-tension thread has first and second knots formed at each end, the first knot being caught by each end of one or the other part of the front, thereby preventing the loosening or unbinding of the fastening by using the second knot as a backup for the first knot.

* * * * *